(No Model.)
O. P. McDONALD.
FUMIGATOR.
No. 535,849. Patented Mar. 19, 1895.
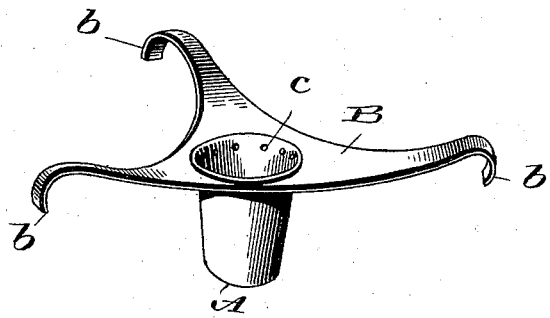
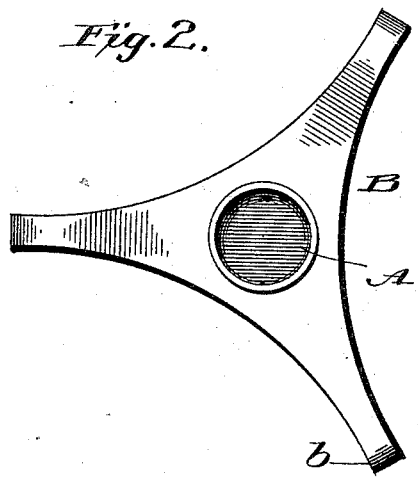
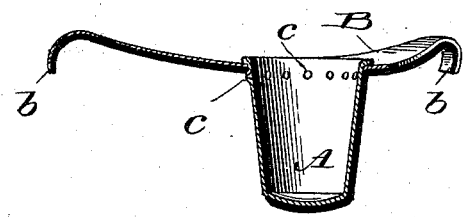
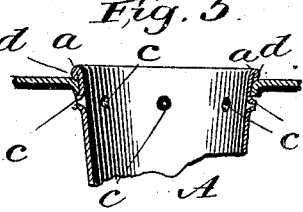
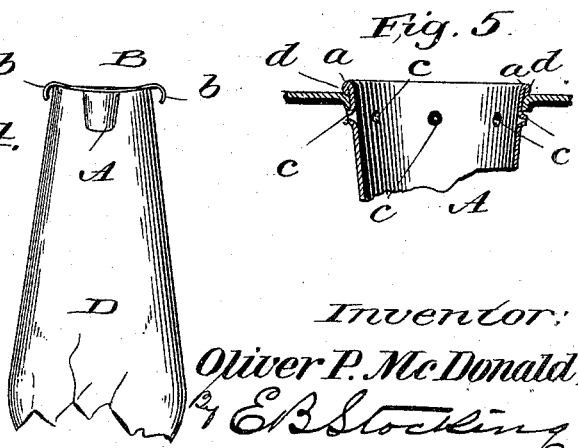
Witnesses:
L. C. Hills
E. H. Bond
Inventor:
Oliver P. McDonald,
by E. B. Stocking
Atty.

UNITED STATES PATENT OFFICE.

OLIVER P. McDONALD, OF DAYTONA, FLORIDA.

FUMIGATOR.

SPECIFICATION forming part of Letters Patent No. 535,849, dated March 19, 1895.

Application filed July 16, 1894. Serial No. 517,706. (No model.)

*To all whom it may concern:*

Be it known that I, OLIVER P. MCDONALD, a citizen of the United States, residing at Daytona, in the county of Volusia, State of Florida, have invented certain new and useful Improvements in Fumigators, of which the following is a specification, reference being had therein to the accompanying drawings.

This invention has for its object to provide a simple and cheap device for support upon a lamp chimney for the purpose of fumigating and exterminating mosquitos and other insects, and clearing a bed-room of the same at night, and it comprises a support preferably of sheet metal having arms adapted to rest upon the chimney top and a receptacle into which insect powder may be placed the flame from the lamp soon causing smoke to arise which will serve to drive away the insects or smother them. The device is simple, cheap of manufacture, easily manipulated, it being simply set upon the upper end of the chimney, and as readily taken off, and requires no attention on the part of the person using the same.

Other objects and advantages of the invention will hereinafter appear and the novel features thereof will be specifically defined by the appended claim.

The invention is clearly illustrated in the accompanying drawings, which, with the letters of reference marked thereon, form a part of this specification, and in which—

Figure 1 is a perspective view of my improved device. Fig. 2 is a top plan thereof. Fig. 3 is a vertical section through the same. Fig. 4 illustrates the same in position for use upon a lamp chimney. Fig. 5 is an enlarged sectional detail showing the manner of holding the receptacle to the support.

Like letters of reference indicate like parts throughout the several views.

Referring now to the details of the drawings by letter, A designates the receptacle for the insect powder. This may be of any suitable material, capacity and shape. It is shown as of a shape resembling a thimble and is held to a support B of substantially triangular shape as seen in Figs. 1 and 2, the arms of which terminate in the downwardly-extending portions $b$ which serve to limit the movement of the support after it is placed upon the top of a chimney as indicated in Fig. 4. This support is dished as seen in Figs. 1 and 3 to throw the receptacle as far down within the chimney as possible.

The receptacle can be held to its support in any suitable manner. The upper end of the receptacle may be provided with a bead or rim $a$ as seen in Fig. 5 which will prevent its passing downward through the opening in the support within which it is arranged, or it may be retained in position by punching holes $c$ in the upper portion of the receptacle, the material thus forced out serving to support the receptacle and prevent its displacement, as seen best Fig. 5. In this instance the receptacle is held against movement either up or down, in the former direction by flange $d$ around the opening through which the receptacle passes, and in the latter direction by the forced out metal of the receptacle.

In use the device is placed over the top of the lamp chimney D as seen in Fig. 4, the receptacle extending down within the same, and the outer ends of the arms of the support may be bent farther downward if desired to hold the device against movement on the chimney, the insect powder being placed in the receptacle either before or after the device is placed upon the chimney. The flame from the lamp will soon cause the powder to issue forth a smoke which will issue for a time after the lamp has been extinguished, or to flash, according to the nature of the powder.

The shape of the arms is such as not to impede the draft of the lamp.

What is claimed as new is—

The combination with a triangular support having its upper face dished and provided with arms, the outer ends of which are curved and turned downwardly, of a receptacle supported within an opening in said support and provided with circumferentially disposed openings, the metal stamped from which serves to prevent the movement of the receptacle on its support, substantially as shown and described.

In testimony whereof I affix my signature in presence of two witnesses.

OLIVER P. McDONALD.

Witnesses:
 WM. FRANCES BUCKNOR,
 WM. WIEKING.